UNITED STATES PATENT OFFICE.

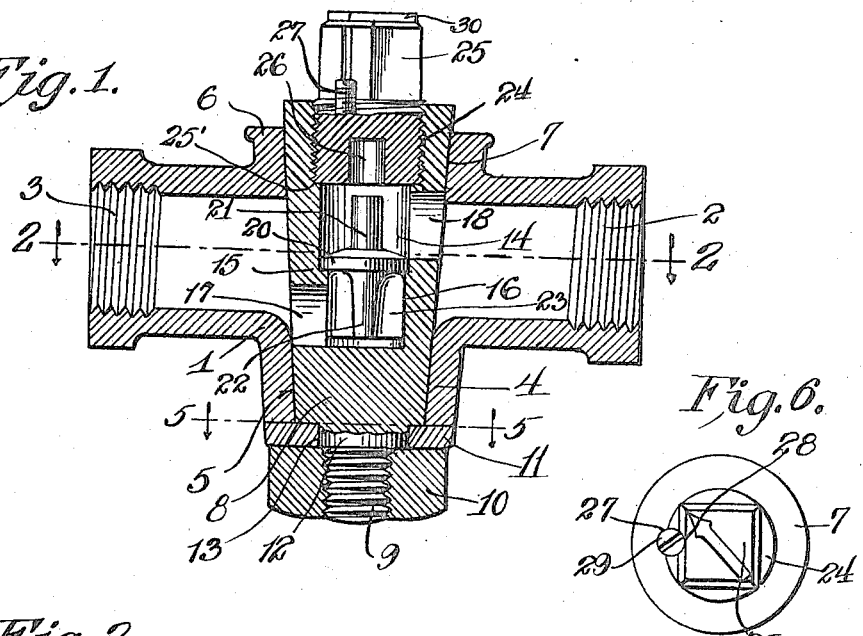

JOHN R. GROOM, OF FRANKLIN, PENNSYLVANIA.

VALVE.

1,238,664.   Specification of Letters Patent.   Patented Aug. 28, 1917.

Application filed October 12, 1916. Serial No. 125,237.

*To all whom it may concern:*

Be it known that I, JOHN R. GROOM, a citizen of the United States, residing at Franklin, in the county of Venango and State of Pennsylvania, have invented certain new and useful Improvements in Valves, of which the following is a specification.

This invention relates to improvements in valves and more particularly to a combination check-valve and stop-cock.

The primary object of the invention is to provide a device of this character having a structure adapted to operate as a check-valve and provided with means whereby the valve mechanism may be utilized as a stop-cock in lines of pipe.

A further object of the invention is to provide a check-valve having a central rotatable core adapted to be reversed whereby the check-valve may be employed in a pipe conducting liquid in either direction, the core carrying a locking plug whereby the valve may be turned to closed position when the check-valve is employed as a stop-cock.

A further object of this invention is the provision of a valve which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which;

Figure 1 is a central longitudinal section, the locking plug being shown partly in elevation.

Fig. 2 is a section on the line 2—2 of Fig. 1.

Fig. 3 is a detail perspective view of the locking plug.

Fig. 4 is a detail perspective view of the valve.

Fig. 5 is a section on the line 5—5 of Fig. 1.

Fig. 6 is a top plan view of the locking plug and core.

Referring to the drawing, wherein is illustrated the preferred form of my invention, and in which like numerals of reference indicate corresponding parts throughout the several views, the body portion 1 of the device is provided with the oppositely disposed openings 2 and 3 for permitting the liquid to pass into and out of the valve. A neck 4 is integrally formed with the body portion 1 and is provided with a central bore 5 communicating with the interior of the body portion 1. A continued portion 6 of the neck extends above the body portion 1 and is also provided with a central circular bore 7. The bore 7 and the bore 5 are tapered slightly to receive the tapered core 8 having its small end disposed in the bore 5 and its large end in the bore 7 and projecting slightly beyond the upper end of the portion 6. A reduced portion 9 is integrally formed with the core 7 and provided with screw threads for receiving the nut 10 adapted to fasten the core in place within the bores 5 and 7. Interposed between the nut 10 and the end of the neck 4 is a washer 11 fitting upon a restricted portion 12 of the core which is provided with a flat side 13 while the opening in the washer 11 is adapted to fit the restricted portion 12 when in applied position. A central opening 14 extends from the large end of the core and longitudinally thereof and terminates at a valve seat 15 disposed intermediate the ends of the core. A continuation 16 of the central bore 14 is restricted in diameter and communication with the continuation 16 of the opening and the interior of the body portion is provided by the passageway 17 leading from the opening 3. A second passageway 18 communicates with the opening 14 and establishes communication with the opening 2. It will be understood, of course, that the device is disposed in a vertical position in order that it may properly operate and is provided with a vertically movable valve designated in its entirety by the numeral 19. This valve comprises a valve disk 20 adapted to be normally seated in the valve seat 15. Integrally formed with the valve disk 20 is a guide stem 21 extending vertically into the central opening 14 as clearly shown by Fig. 1 of the drawing. Depending from the bottom of the valve disk 20 is a guide stud 22 provided with a plurality of flutes 23 whereby the liquid may pass through the opening 16 into the opening 14 when the valve disk 20 is raised from its valve seat 15.

Screw threadedly mounted in the screw threaded portion of the opening 14 is a screw cap having a screw threaded portion 24 adapted to engage the screw threads in the opening 14. A square extension 25 is formed on the screw threaded portion 24 and is adapted to receive a wrench whereby the screw cap may be threaded into the opening 14 for causing the end of the screw cap to engage the shoulder 25'. A central circular depression or recess 26 extends inwardly from the end of the screw threaded portion and is slightly larger in diameter than the guide stem 21. A screw threaded locking key 27 is mounted in the threaded keyways 28 and 29 formed in the screw cap and the core respectively whereby the plug and the core may be held against independent movement when the locking key 27 is in place. When the key is removed, however, the screw cap is free to rotate in the opening 14.

As shown by Fig. 1 of the drawing, the parts are set in position for use as a check-valve. The water or liquid passes through the opening 3 and then through the passageway 17 and the force of the liquid will cause the valve disk 20 to rise from its seat 15 and the valve will be prevented from moving out of the vertical path of movement by the guide stem 21 and the guide stud 22. The fluted portions of the guide stud 22 will permit the liquid to pass into the opening 14 and out through the passageway 18 where it will find an exit through the opening 2. As soon as the pressure of the liquid has been reduced the valve will seat itself and thereby prevent the liquid from backing through the valve thus operating exactly as a check-valve. When the key 27 is in place, a wrench may be applied to the square extension 25 for rotating the core a half turn thereby permitting the check-valve to operate in the reverse direction.

To employ the device as a stop-cock, it will be merely necessary to rotate the core 8 a quarter turn so that the openings 17 and 18 will be in a position whereby communication between the passageways 2 and 3 will be prevented. An indicator in the form of an arrow 30 is integrally formed with the top of the square extension 25 for indicating the direction in which the valve is set.

From the foregoing it will be observed that a very simple and durable valve has been provided, the details of which embody the preferred form. I desire it to be understood however, that slight changes in the minor details of construction may be made without departing from the spirit of the invention or the scope of the claims hereunto appended.

I claim:

1. A valve of the character described comprising a body portion having an inlet and an outlet and a central tapered bore, a tapered core mounted within the said bore and provided with oppositely disposed passageways, the said core also having a longitudinal opening establishing communication between the two of said passageways, a valve mounted for vertical movement within the longitudinal opening, a screw cap mounted for longitudinal movement in the longitudinal opening, the said screw cap and the said core being provided with screw threaded key-ways in registration, a locking key removably mounted in the said key-ways whereby the said locking plug may be moved independently of or simultaneously with the said core.

2. The combination with a valve body having an inlet and an outlet and a central tapered bore, a core fitting in the said tapered bore and rotatably mounted therein, the said core having openings for establishing communication between the inlet and outlet when the core is turned to open position, the said core also having a longitudinal opening, a valve mounted in the said last mentioned opening and provided with a stem extending through the said longitudinal opening, a screw cap screw threadedly mounted in the end of the longitudinal opening in the core, the core and the cap having key-ways in registration when the cap is in applied position, a locking key fitted in the said key-ways for causing rotation of the core when the cap has rotated, and an indicator element on the cap for designating the position of the openings in the core within the valve body.

In testimony whereof I affix my signature in presence of two witnesses.

JOHN R. GROOM.

Witnesses:
W. H. HAUSE,
CLIFFORD STUCK.

Copies of this patent may be obtained for five cents each, by addressing the "Commissioner of Patents, Washington, D. C."